United States Patent [19]
Gormish et al.

[11] Patent Number: 5,692,048
[45] Date of Patent: *Nov. 25, 1997

[54] METHOD AND APPARATUS FOR SENDING SECURE FACSIMILE TRANSMISSIONS AND CERTIFIED FACSIMILE TRANSMISSIONS

[75] Inventors: Michael J. Gormish, Los Altos; Gregory J. Wolff, Mountain View; David G. Stork, Stanford; Peter E. Hart, Menlo Park; Yoshio Kawajiri, San Jose, all of Calif.

[73] Assignees: Ricoh Company, Ltd., Tokyo, Japan; Ricoh Corporation, Menlo Park, Calif.

[*] Notice: The term of this patent shall not extend beyond the expiration date of Pat. No. 5,337,362.

[21] Appl. No.: 271,871

[22] Filed: Jul. 7, 1994

Related U.S. Application Data

[63] Continuation-in-part of Ser. No. 48,376, Apr. 15, 1993, Pat. No. 5,337,362.

[51] Int. Cl.$^6$ .................................................. H04L 9/32
[52] U.S. Cl. .............................. 380/18; 380/51; 380/21
[58] Field of Search .............................. 380/18, 51, 55, 380/21

[56] References Cited

U.S. PATENT DOCUMENTS

| | | | |
|---|---|---|---|
| 4,430,728 | 2/1984 | Beitel et al. | 364/900 |
| 4,782,221 | 11/1988 | Brass et al. | |
| 4,916,738 | 4/1990 | Chandra et al. | 380/25 |
| 5,113,445 | 5/1992 | Wang | |
| 5,222,136 | 6/1993 | Rasmussen et al. | 380/9 |
| 5,245,655 | 9/1993 | Buhn et al. | 380/18 |
| 5,321,749 | 6/1994 | Virga | |
| 5,339,361 | 8/1994 | Schwalar et al. | 380/23 |
| 5,351,136 | 9/1994 | Wu et al. | 380/18 |
| 5,509,071 | 4/1996 | Petrie, Jr. et al. | 380/4 |

FOREIGN PATENT DOCUMENTS

| | | |
|---|---|---|
| 0469864 | 7/1991 | European Pat. Off. |
| 0493053 | 12/1991 | European Pat. Off. |
| 0493091 | 12/1991 | European Pat. Off. |

Primary Examiner—Gilberto Barrón, Jr.
Attorney, Agent, or Firm—Blakely, Sokoloff, Taylor & Zafman

[57] ABSTRACT

A facsimile transmission system with a first facsimile machine that includes at least a scanner for scanning documents inserted into a document feeder and transmission capabilities for sending a fax and with a second facsimile machine that includes at least reception capabilities for receiving the fax and a printer for printing a hard copy of the received fax, if necessary. The facsimile system may include functionality for securing the facsimile transmission. The facsimile system may include functionality to enable the facsimile transmission to be certified.

48 Claims, 13 Drawing Sheets

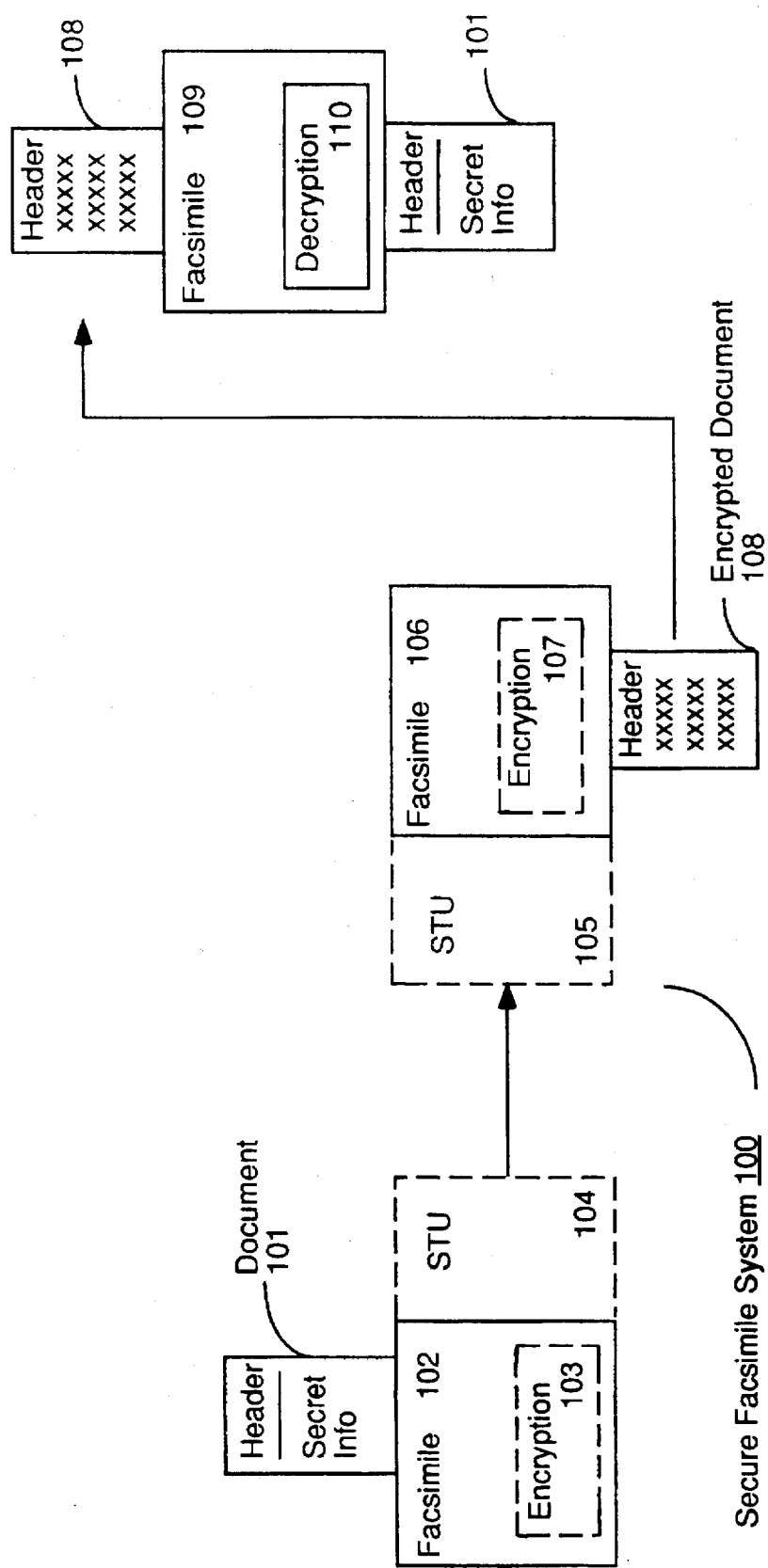
FIG_1

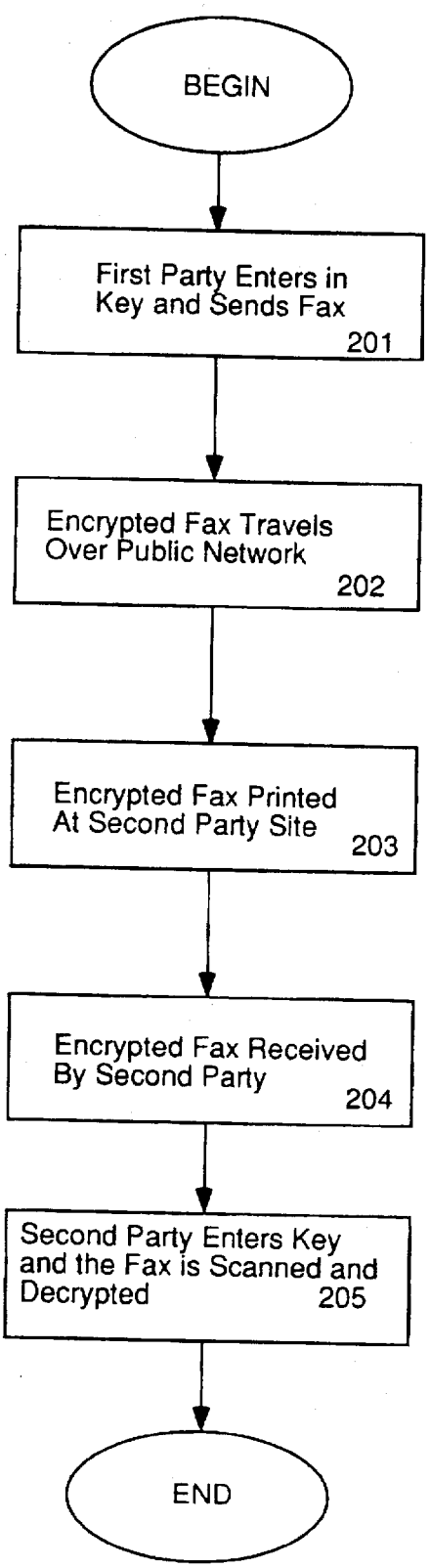
FIG_2

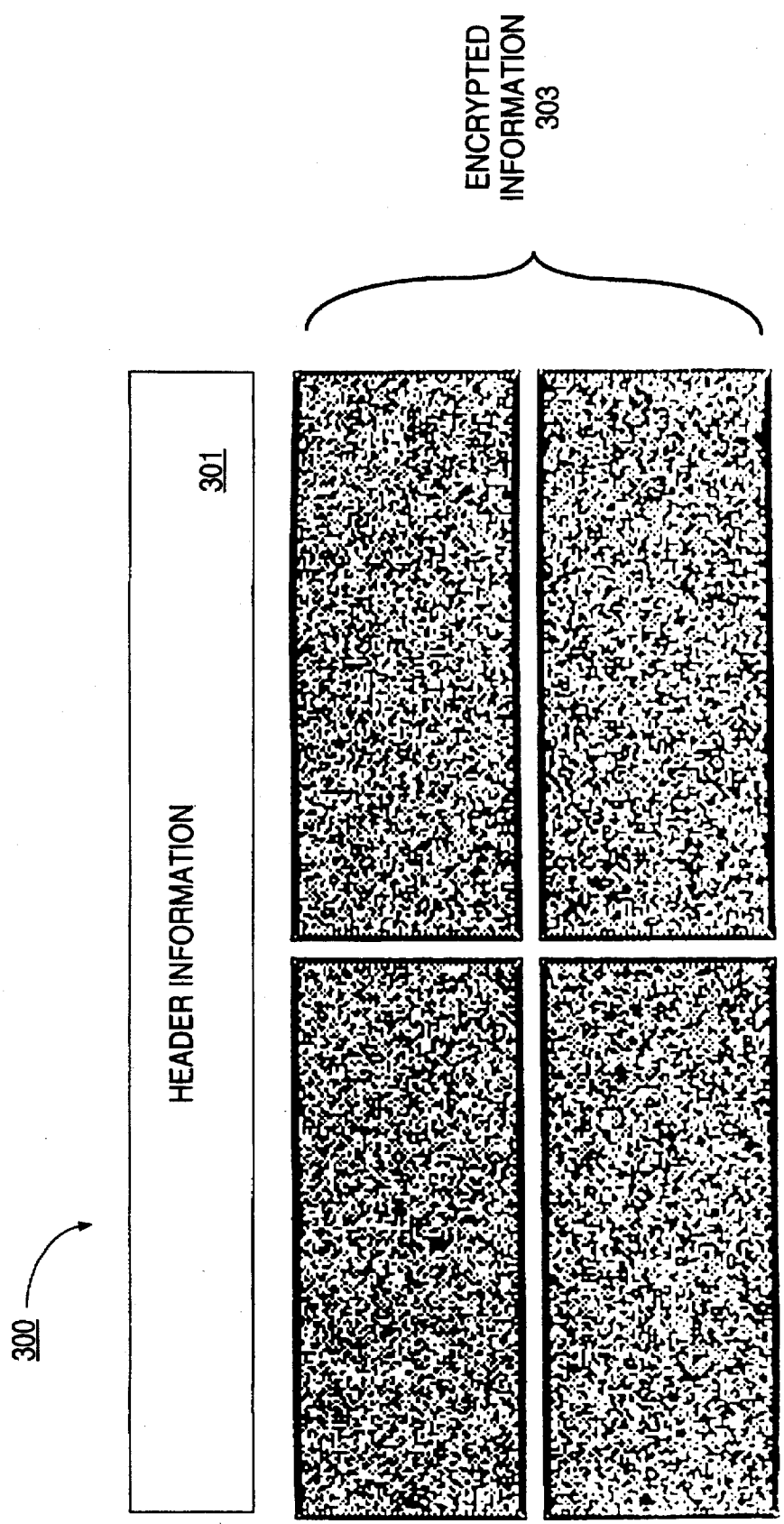
FIG_3

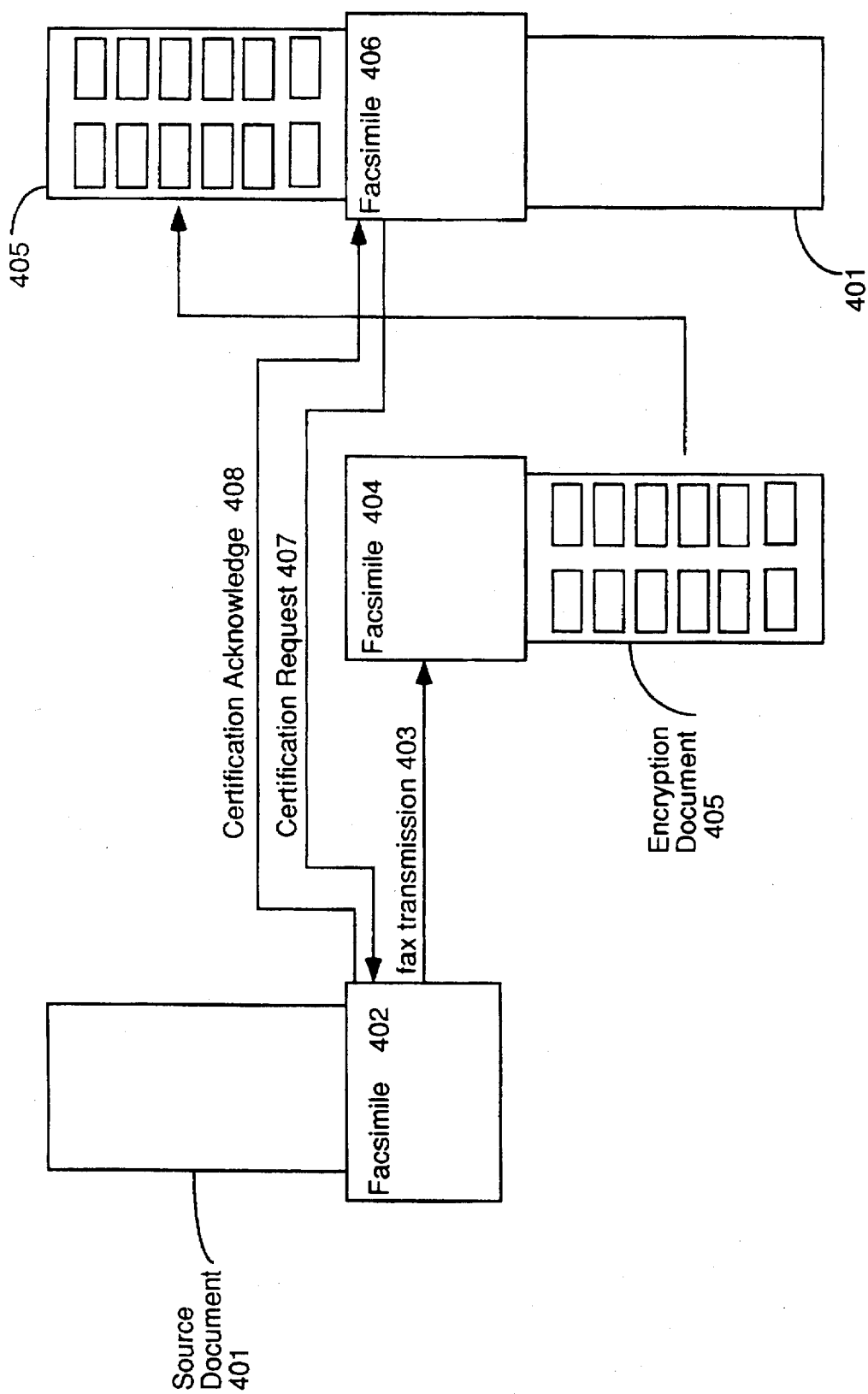

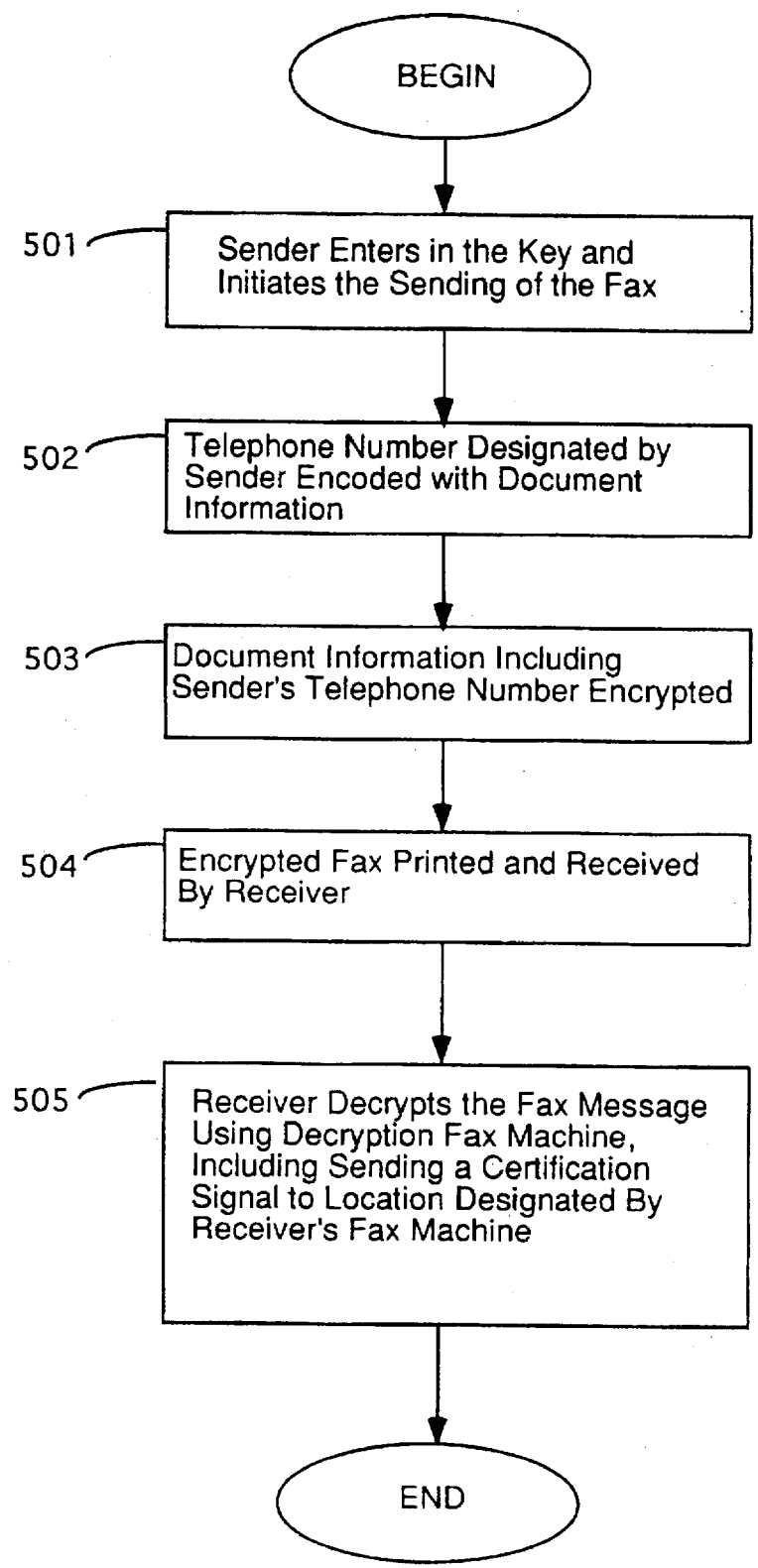
FIG_5

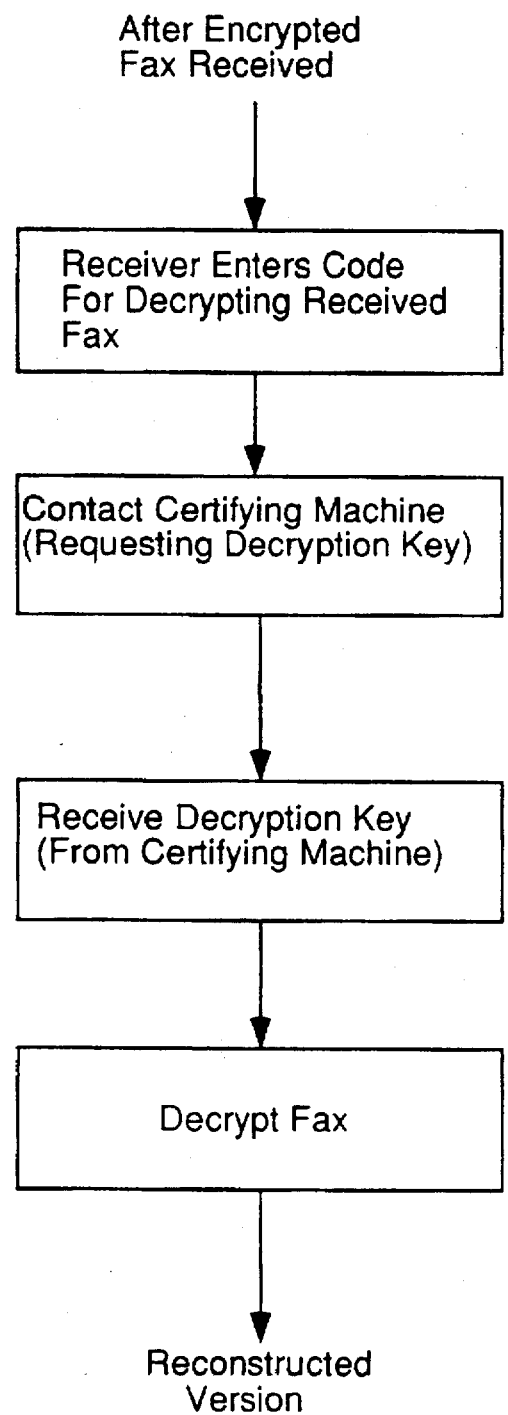
FIG_6

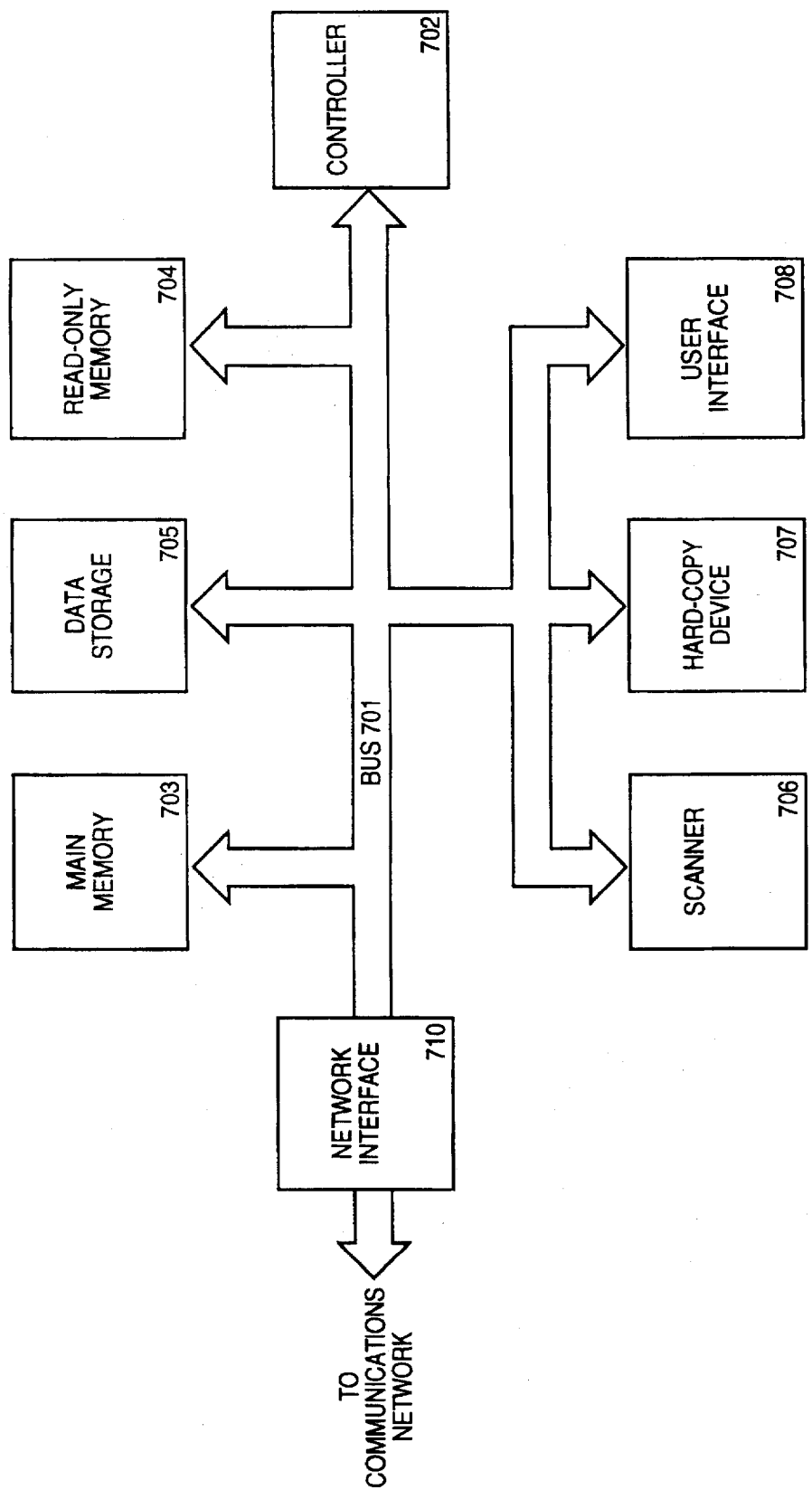
FIG_7

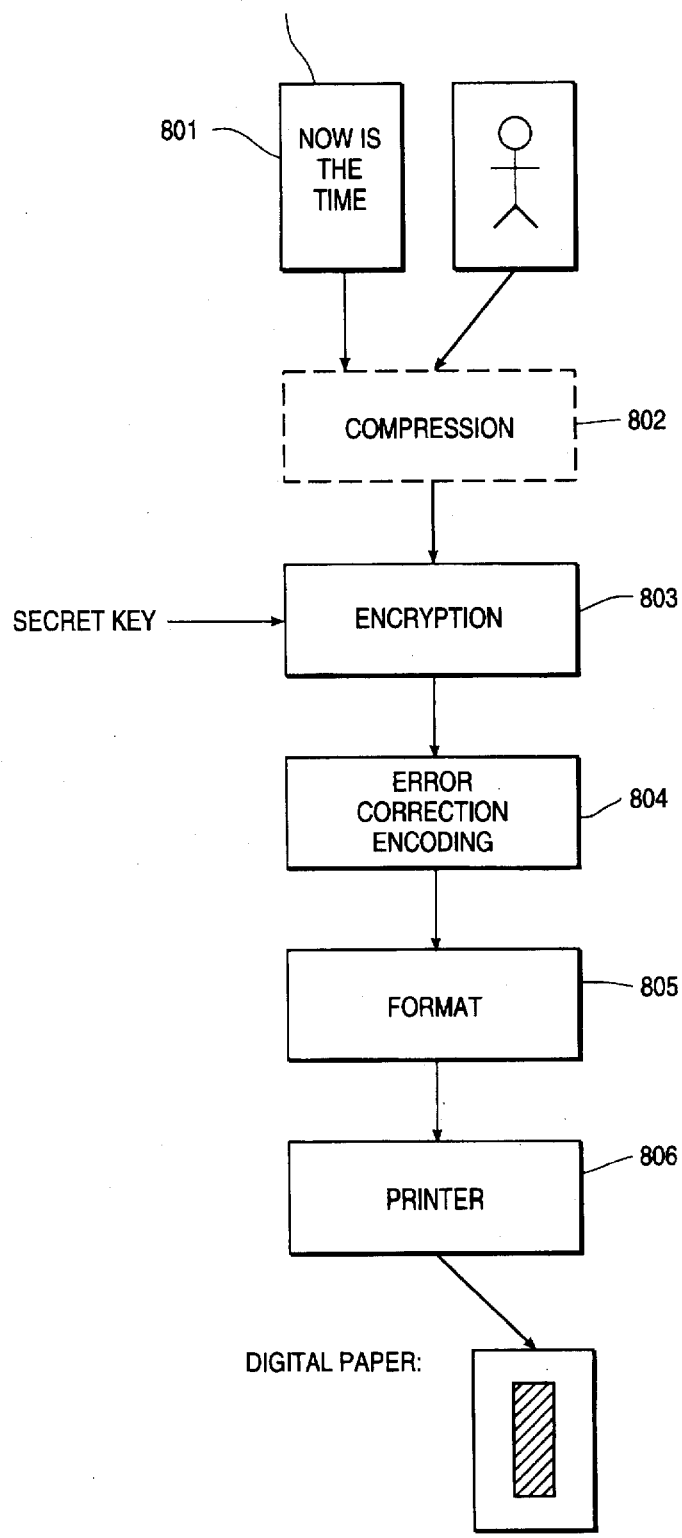
FIG_8 ENCODING PROCESS

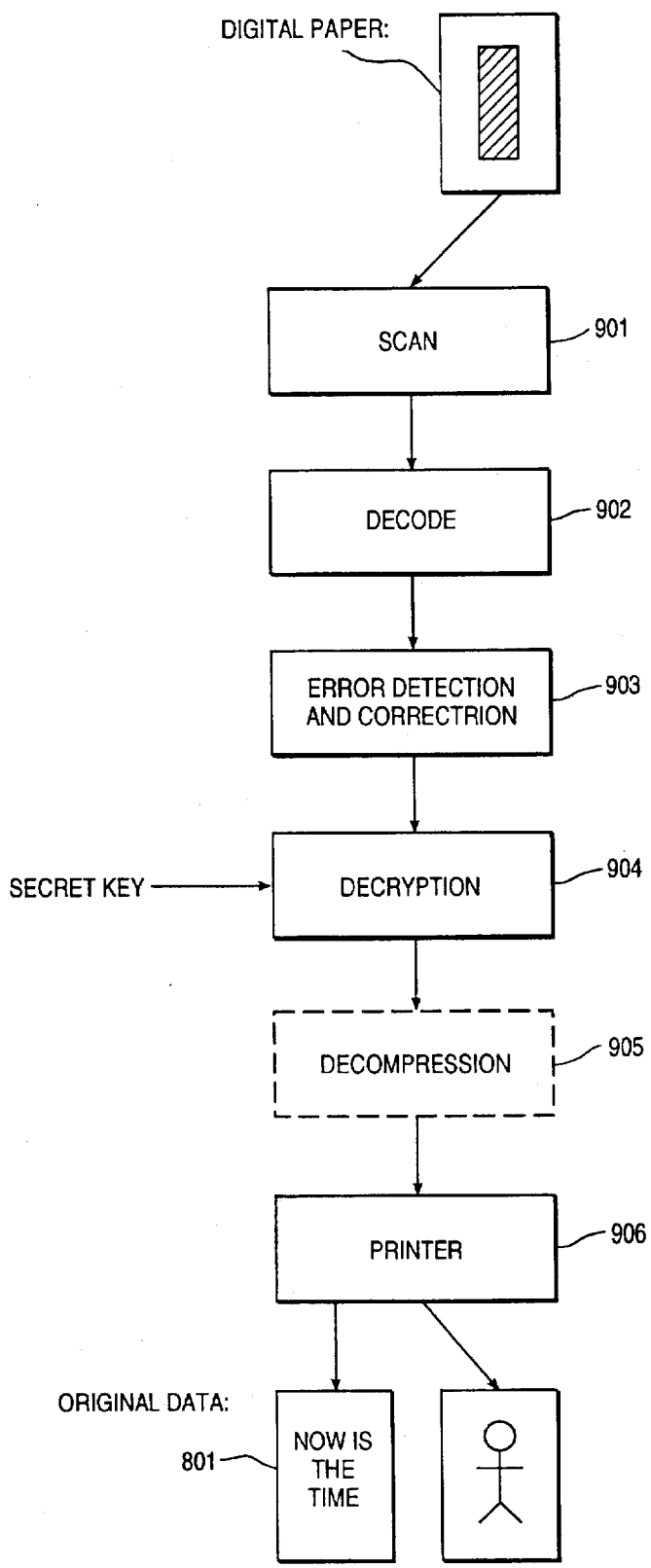
FIG_9  DECODING PROCESS

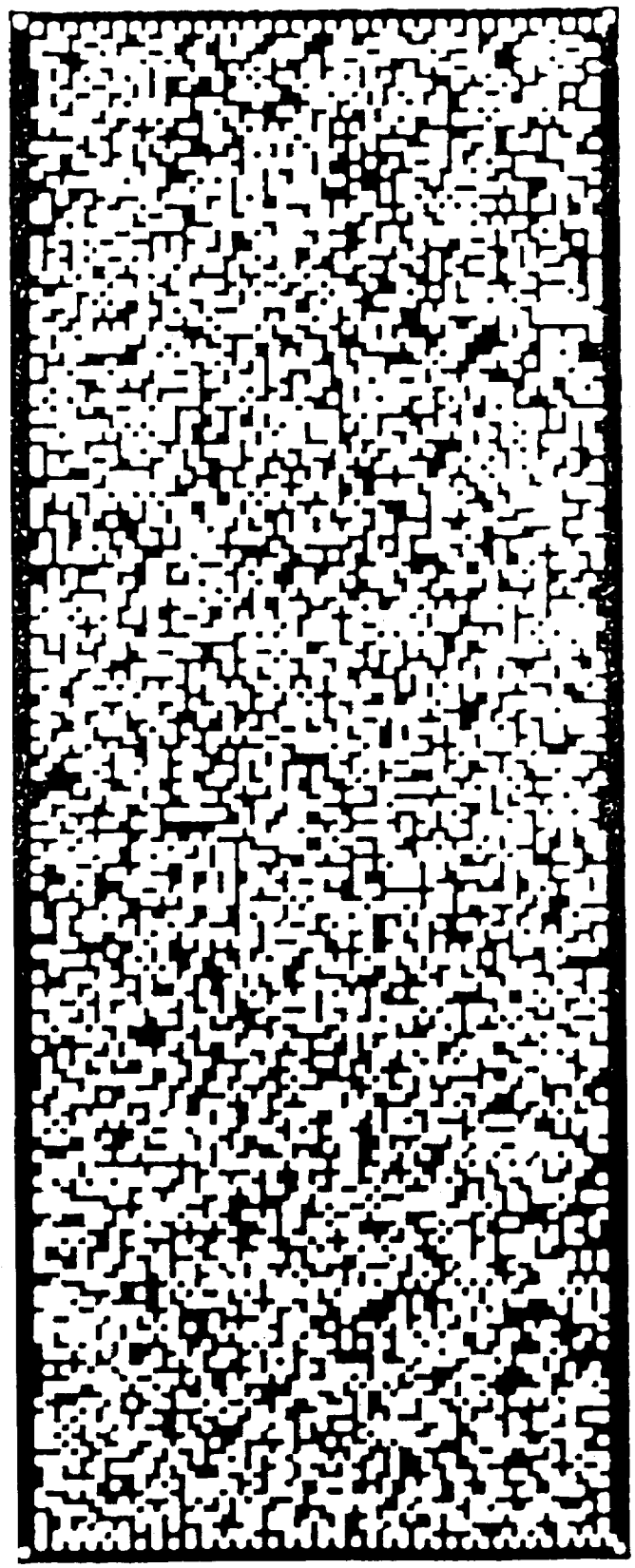
FIG_10A

FIG_10B
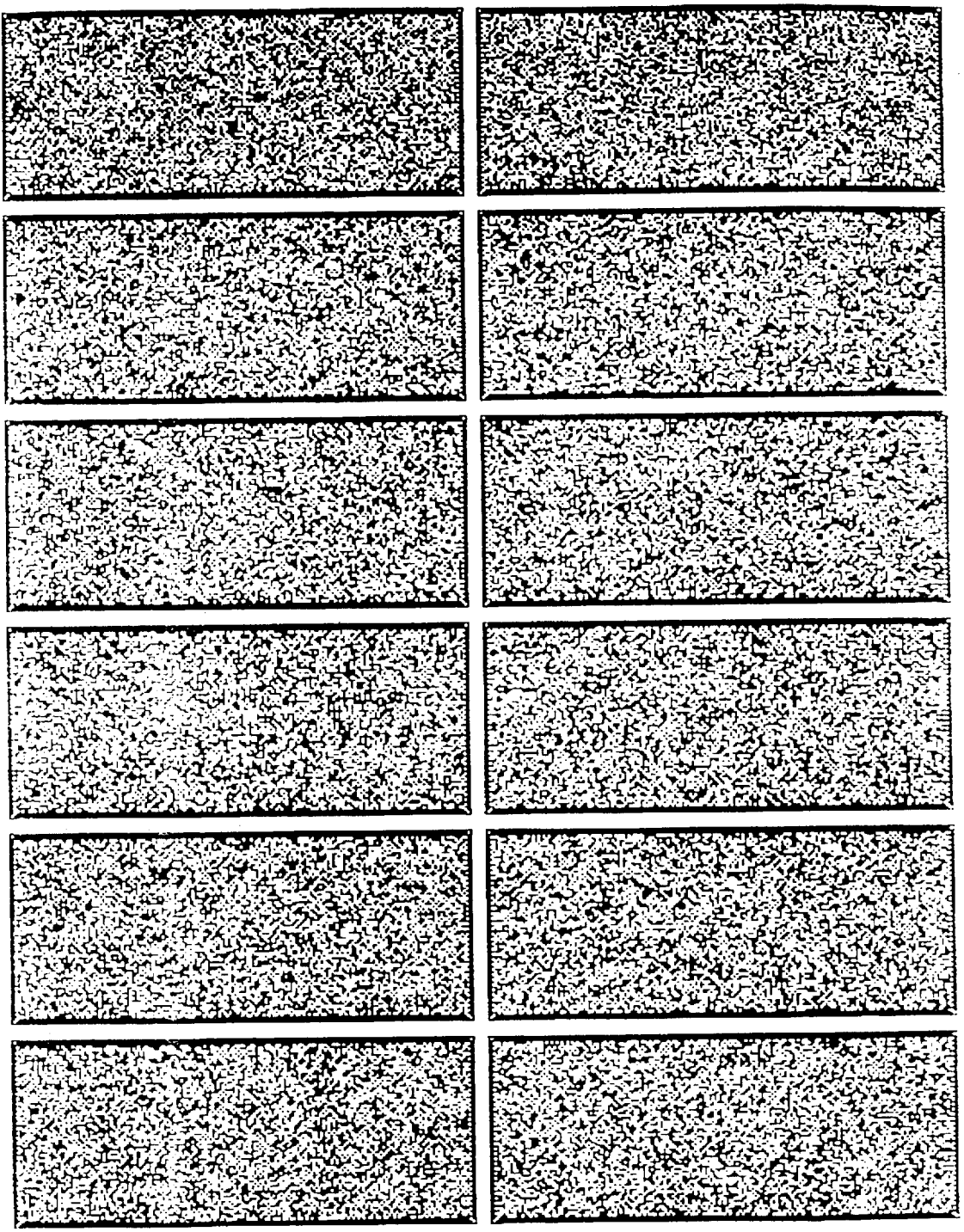
THIS END DOWN

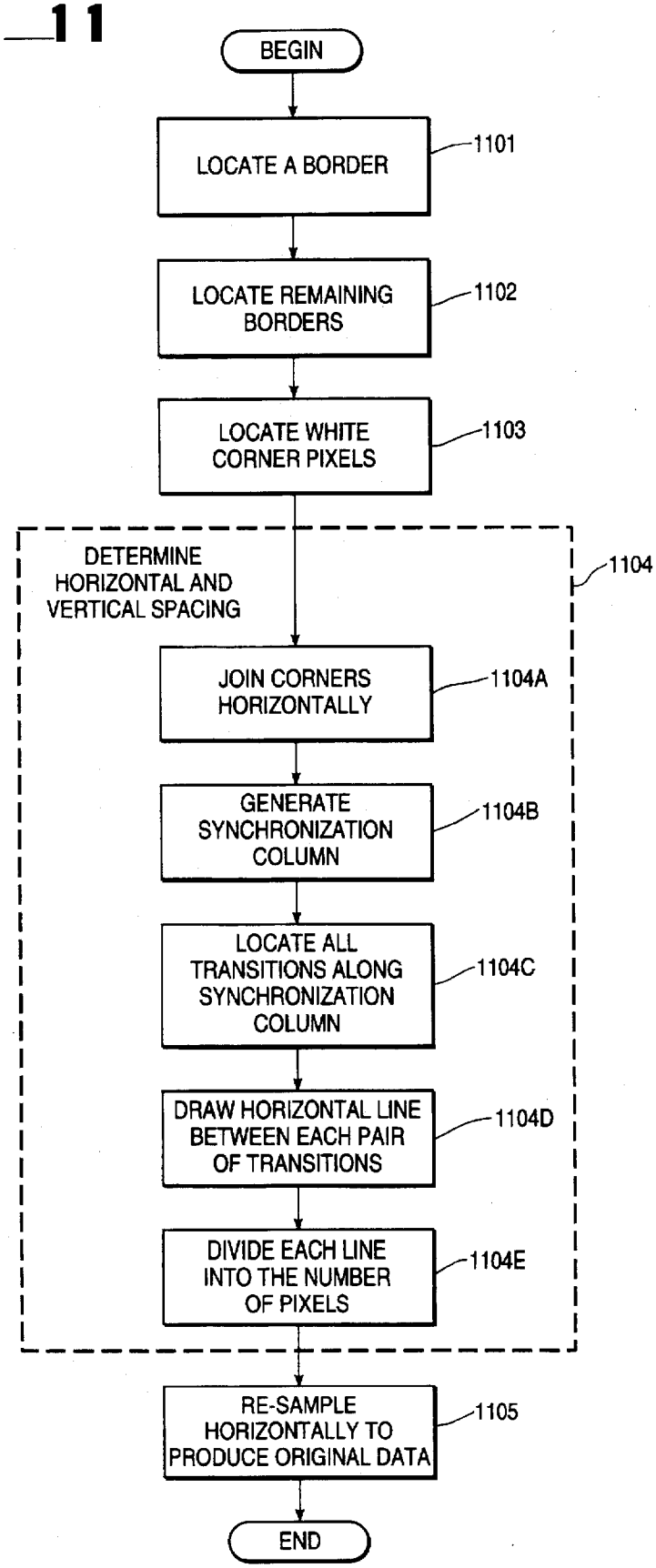
FIG_11

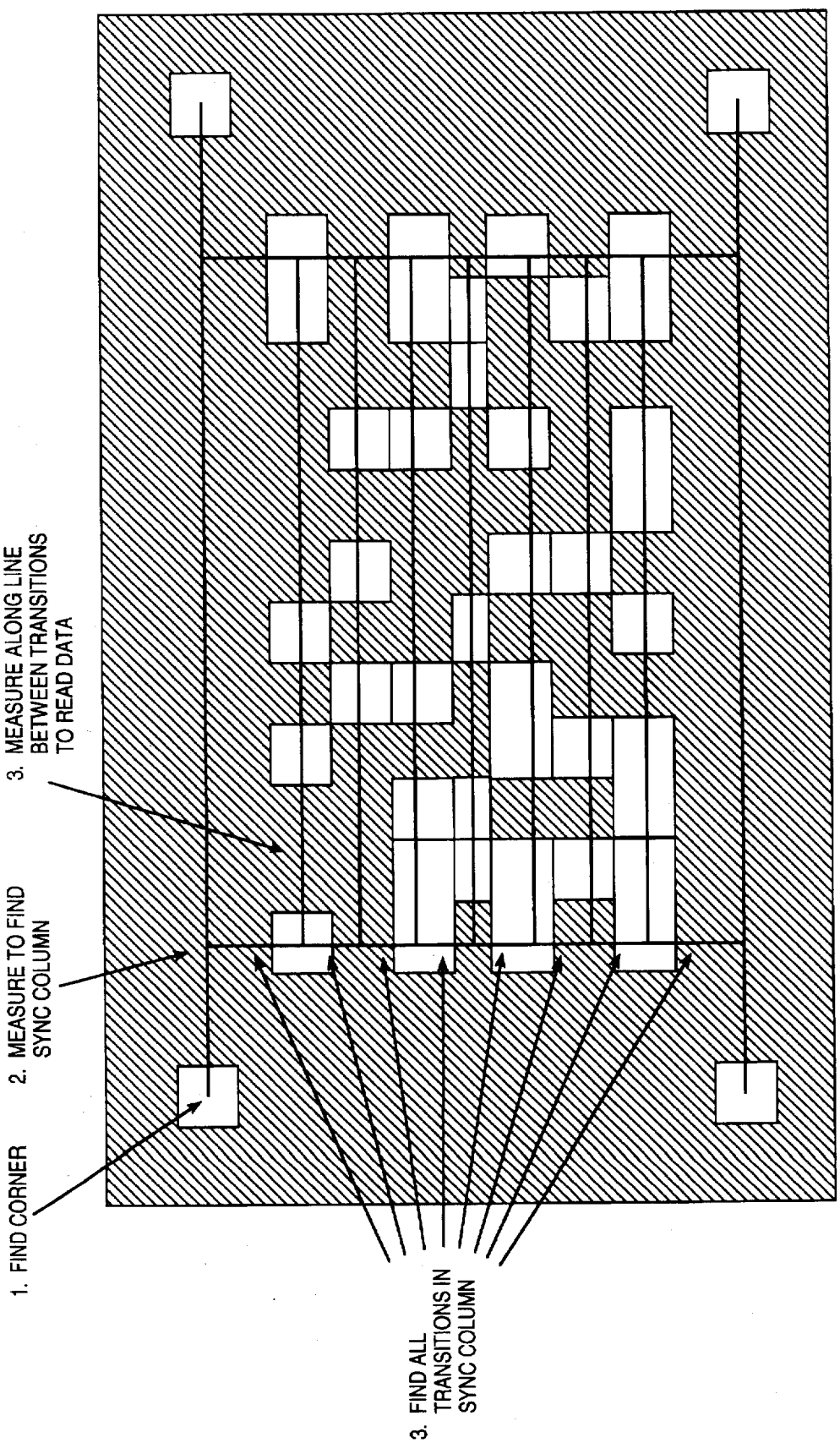

METHOD AND APPARATUS FOR SENDING SECURE FACSIMILE TRANSMISSIONS AND CERTIFIED FACSIMILE TRANSMISSIONS

This application is a continuation-in-part of U.S. patent application Ser. No. 08/048,376, entitled "A Method and Apparatus for Placing Data onto Plain Paper", filed Apr. 15, 1993, now U.S. Pat. No. 5,337,362.

FIELD OF THE INVENTION

The present invention relates to field of facsimile data transmission; particularly, the present relates to performing a secure facsimile transmission and a certified facsimile transmission.

BACKGROUND OF THE INVENTION

Facsimile transmission of documents is a normal occurrence in business today. The documents transmitted are more commonly referred to as "faxes". In a fax transmission, an individual places a document in a facsimile ("fax") machine, where it is scanned into a digital format. This digital representation of the original document is sent over public telephone lines, or some communications network, and received by another facsimile machine. This second facsimile machine then prints the digital data onto a piece of paper.

One problem with the current practice of faxing documentation is the lack of security available. For instance, if a person wishes to fax a document containing information that the sender only wishes a designated receiver to see (e.g., a secret fax), a number of obstacles exist. First, if both the sender and the receiver have ordinary facsimile machines running on the public telephone network, the sender must contact the receiver and indicate that a secret fax is to be sent to the receiver. The receiver then must go to the receiving facsimile machine and wait for the facsimile machine to become idle. When the facsimile machine is idle, the receiver must contact the sender to indicate that the receiver is at the facsimile machine waiting for the fax. At that time, the sender is able to send an ordinary fax which the receiver thereafter receives. Even though no one else in the current vicinity of the receiver is likely is see the fax, the data is sent through an unsecure telephone network where a competitor could have intercepted a copy. Also, if the sender dials the wrong phone number, an individual in another company may see the secret fax. Even worse, if the receiver has a facsimile machine which automatically saves a certain number of faxes (e.g., the facsimile machine stores the last 10 faxes) and allows them to be reprinted, others may have access to the secret fax (in the case where the receiver is unaware of such a feature).

Even if the facsimile machines of both the sender and the receiver are connected to a Secure Telephone Unit (STU) where encryption is provided over the telephone line, problems in transmitting a secret fax exist in that the sender must still contact the receiver and indicate that a fax is being sent, thereby requiring that the receiver still go to the STU to receive the fax. In both of these situations, the sender and receiver must be able to contact each other and coordinate actions on both sides of the facsimile transmission in order to insure the security of the fax. However, this may be inconvenient, especially where either or both parties are unable to contact each other, such as, for instance, if the sender and receiver are in different time zones or even different countries. The problem is compounded if the sender desires to send several copies to different people at the same time.

The sender and receiver may have facsimile machines with a "confidential receive" feature allowing the sender to send the receiver a fax which is not printed until the receiver goes to the facsimile machine and enters a secret code. However, this fax is still accessible to eavesdropping if it travels on the public telephone network, unless the facsimile machines are connected to a STU. However, if the facsimile machines are connected to a STU, then the receiver must still go to the STU and insert his key, which may present the same problems of the previous as above. Also, a facsimile machine with a "confidential receive" feature may have a limited amount of memory or may have a power failure. If such is the case, the faxes must be retrieved quickly or it may be impossible to send further confidential faxes.

As each of the above cases indicates, the current methods of facsimile transmission of documents does not lend itself well to the transfer of confidential or secret (e.g., private) information. Therefore, it is desirable to provide for sending and receiving facsimile transmissions in a secured manner.

Another problem with current facsimile transmission is that there is no way for the sender to know, or certify, that a particular designated receiver has received the faxed document. Also there is no way for the fax sender to know when a fax was received and at the same time to insure that only the intended receiver obtains the fax. While current facsimile machines echo the telephone number of the receiving fax to confirm that the transmission has taken place, there is no guarantee that the desired receiver has actually received the fax or that the receive fax phone number is programmed correctly, as many other people in an office environment could have picked up the fax. Moreover, there is currently no automated way to know when the receiver received the fax. In some cases, it may be hours, days or weeks before the receiver receives the fax transmission. The only known confirmation is through the sender and receiver making contact through the telephone or some other communicative manner to confirm the receipt. The U.S. Mail provides for "certified letters" in which the desired receiver signs for a letter that is only delivered to him. Likewise, other mail carriers and rapid delivery systems often deliver documents and packages requiring "certified" signers. However, there is currently no way to certify a fax in the same way that these certified letters and signers certify reception of a letter or other received material. Therefore, it is desirable to provide for fax transmission the receipt of which may be certified.

The present invention provides a facsimile system for sending and receiving secured fax transmissions. The facsimile system eliminates the need for coordinating efforts between multiple parties, such as multiple receivers. Also, the present invention provides a system for sending and receiving fax transmissions which may be certified in a manner similar to a certified letter sent and received through the U.S. Mail. The certification allows the sender to know that a particular desired receiver has received a fax document and at the same time insure that only the intended receiver controls the fax.

SUMMARY OF THE INVENTION

A method and apparatus for transmitting secured facsimiles and certified facsimiles is described. The present invention provides for scanning an original document into a first series of digital data values at a first location. The first series of data values are encrypted. Encrypted set of data values are sent over a communications network to a second site. The encrypted data values are received and printed at the second site on a piece of paper. These encrypted data values can be recovered via scanning and then decrypted.

The present invention also includes an apparatus for sending data as a facsimile transmission. Data is then received and printed to produce a document having encrypted information. The document is then scanned and decrypted. As part of the decryption process, an indication is sent to a number designated on the received document indicating that decryption has occurred.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 1 is a block diagram of a secure facsimile system according to the present invention.

FIG. 2 illustrates the process for sending a secured facsimile according to the present invention.

FIG. 3 is one example of a portion of a secured facsimile.

FIG. 4 illustrates one embodiment of a facsimile system having certification capabilities.

FIG. 5 illustrates a process for sending a certified facsimile.

FIG. 6 illustrates one embodiment of the process for providing the certification to the sender of a facsimile.

FIG. 7 illustrates one embodiment of the facsimile machine of the present invention.

FIG. 8 illustrates the encoding process of the present invention that includes encryption.

FIG. 9 illustrates one embodiment of the decoding process of the present invention that includes decryption.

FIG. 10A is one embodiment of a block of encrypted digital data produced according to the present invention.

FIG. 10B illustrates a single sheet of digital paper of the present invention.

FIG. 11 is a flow chart of a decoding process of the present invention.

FIG. 12 illustrates one embodiment of the data box of the present invention being subjected to the decoding routine of the present invention.

DETAILED DESCRIPTION OF THE INVENTION

A method and apparatus for transmitting facsimile reproductions of documents in a secure manner and in a certifiable manner is described. In the following description, numerous specific details are set forth such as encryption/decryption techniques, formatting techniques, etc., in order to provide a thorough understanding of the present invention. It will be apparent, however, to one skilled in the art that the present invention may be practiced without these specific details in other instances, well-known operations and functions have not been described in detail to avoid unnecessarily obscuring the present invention.

The present invention provides for transmitting secured faxes and certified faxes. The present invention is implemented to provide such secured and certified faxes by placing digital data on plain paper with a facsimile machine. The digital data is encrypted or undergoes machine readable coding such that it remains secure upon reading the plain paper. The data may also undergo other data processing techniques, such as compression and decompression, as well as error correction and specific formatting. One embodiment of the formatting used to place the encrypted information on the plain paper is described in U.S. patent application Ser. No. 08/048,376, entitled "A Method and Apparatus for Placing Data onto Plain Paper", filed Apr. 15, 1993, incorporated by reference herein and assigned to the corporate assignee of the present invention. If formatting is used, the facsimile machines of the present invention on both sides of the transmission utilize the same data formatting techniques to enable the digital data being received to be converted into information that when printed is readable by the human receiver.

Secured Facsimile Transmission

FIG. 1 illustrates components of the secured facsimile system of the present invention. Referring to FIG. 1, a document 101 that includes a header and information the user wishes to disclose only to the receiver (e.g., confidential or secret information) is placed in a facsimile machine 102 which scans in the document(s) for transmission. Facsimile machine 102 may include encryption capabilities, such as encryption block 103, that encrypts data of document 101. Note that any desired encryption may be provided by another machine initially prior to scanning the document for transmission. The output of the facsimile machine 102 is coupled to a communications network, such as public or private telephone lines, either directly or indirectly. In one embodiment, a secured telephone unit (STU) 104 may interface the facsimile machine 102 to the communications network. In one embodiment, document 101 may be created on or electrically transferred to a computer. Such a document 101 may then undergo encryption using the computer and then be sent by a fax modem (to a regular paper producing facsimile machine). Instead of encryption, facsimile machine 102 may provide machine readable coding to place data of document 101 in a form unreadable to a human.

The faxed document is sent to a receiving facsimile machine, such as facsimile machine 106. In one embodiment, facsimile machine 106 may be a paper producing facsimile machine. Facsimile machine 106 may also be a computer system. In the case where STU 104 is included in the system, a similar STU 105 is used to interface facsimile machine 106 to the communications network to receive the transmission. Note that facsimile machine 106 may include encryption capabilites, such as encryption block 107, as well as decryption capabilities. The output of facsimile machine 106 is encrypted document 108. The same encrypted document 108 is fed into facsimile machine 109 (at the receiver's convenience) that includes decryption capabilities, such as decryption block 110, which allows it to output a reconstructed version of document 101. If document 108 is in a machine readable format, facsimile machine 109 includes machine readable decoding facilites to produce the reconstructed version.

Note that the facsimile machine depicted in FIG. 1, such as facsimile machines 102, 106 and 109, includes the typical facsimile functionality, such as a scanner for inputting documents, a printer for printing received documents, transmission functionality, and input/output (I/O) capabilities such as keypad, for inputting telephone numbers or codes recognizable by the facsimile machine or a telephone/ modem line hook up mechanism for dialing up and initiating a communications channel with another facsimile machine.

FIG. 2 illustrates the process of sending a secured fax using the secured fax system 100 of FIG. 1. Referring to FIG. 2, initially a first party (e.g., the sender) places a document in facsimile machine 102 and enters a secret key on its keypad (processing block 201). The secret key is known by the receiver and enables the receiver to decode the fax. The facsimile machine 102 scans in the information on the document into a series of digital data values and, using encryption block 103, encrypts the digital data values. The encrypted information is then transmitted over the communications network (e.g., telephone network) to the facsimile machine 106 (processing block 202). The encrypted information received is printed by facsimile machine 106 at the destination site to produce encrypted document 108 (processing block 208). To reiterate, a computer system may be used to create, encrypt and/or transmit the fax.

Facsimile machine 106 prints encrypted document 108 (the secret fax) with a header. The header may contain information that designates the intended receiver of the secret fax and other information identifying one or both of the parties (e.g., address, sender's home, etc.) and may also include specific information about the document itself. In one embodiment, the header is not encrypted and is readable by an operator. An example of such a facsimile reproduction is shown in FIG. 3, with header information 301 and encrypted information 303. Note that the entire document may be encrypted when the intended recipient is known at the receiving end.

The document is then received by the designated recipient (processing block 204). After the encrypted fax document 108 has been delivered to the receiver, through ordinary channels, the receiver can take the secret fax to a computer scanner or special facsimile machine, such as fax 109, to decrypt the fax. In either case, the receiver enters a decryption key, the encrypted document is scanned and decrypted according to the key and a readable fax is fixed in a tangible medium (e.g., the fax is printed, the fax is stored in computer memory, etc.). Therefore, at the convenience of the receiver, the fax may be decrypted. Using such a system, the secret information in the original document is secured through the facsimile transmission process.

As shown in FIG. 1, if facsimile machine 102 includes encryption block 103, the secured telephone unit 104 and 105 are not required in the system since the fax that is traveling over the public telephone network would be encrypted. In another embodiment, facsimile machine 102 may not include encryption block 103. In such a case, the encryption may be provided in facsimile machine 106, by encryption block 107. However, to secure the information over the public network, the STU 104 and STU 105 may be included. The encrypted document 108 would be generated by facsimile machine 106 to be decrypted later at the receiver's convenience. Note that even if facsimile machine 102 does include encryption capabilities, the STUs 104 and 105 may be included to add additional encryption capabilities. In another embodiment, facsimile machine 106 may include decryption capabilities of its own as well as encryption block 107. In such a case, facsimile machine 106 may decrypt the encrypted fax transmission and then provide its own separate encryption process to produce encrypted document 108. Encrypted document 108 would then undergo the same decryption through decryption block 110 to produce the reconstructed version of document 101.

The decryption capabilities of facsimile machine 106 may also be used to decrypt the encrypted document 108 after it has been printed out and received by the user. Therefore, facsimile machine 106 and facsimile machine 109 may be same facsimile machine. In such a case, encrypted document 108 is received and printed by facsimile machine 106 and then later it may be re-fed into facsimile machine 106, which includes decryption capabilities that decrypts the information contained in the fax, and which would be printed out as the reconstructed version of document 101. Note that if facsimile machine 106 and 109 are different, then facsimile machine 106 need not have encryption or decryption capabilites.

The facsimile machine of the present invention may be used to scan in and send an already encrypted document to a separate facsimile machine which would then decrypt the document into a reconstructed version of document 101. Such a system may be used when sending a fax with a prior art facsimile machine system where the encrypted document was created on another system, such as a computer system with a printer (e.g., a laser printer).

A personal computer with an installed facsimile machine (e.g., a fax modem) may be used in the present invention. The sender can encrypt the document on a personal computer and transmit the encrypted document to the receiver's facsimile machine. The receiver can handle the incoming fax just as if it had come from another facsimile machine. If the sender does not have a modem in their computer system, they can print the encrypted document on a normal printer. Then this print out can be passed through normal channels to a person who will fax it to the receiver. The facsimile machine can read the document as digital data and send the already encrypted data over the communications network. Once received, the fax is handled as previously described.

The present invention may be used with any trusted method of encryption. For example, the encryption used by the secured fax system of the present invention may be the Digital Encryption Standard (DES), the Rivest Shamir Adlemen algorithm (RSA), or the emerging governmental sanctioned "clipper chip" or "slip jack" algorithm.

Key exchange according to the present invention can be performed according to numerous methods, such as, for example, the DES or Diffie-Hellmanmethods. Note also that the public key encryption may be used. The receiver may have one publicly available key (perhaps printed on his business card) which anyone can use to send faxes to the receiver which only the receiver can read.

Therefore, the present invention provides secured transmission of faxes between users. The faxes are transmitted securely by utilizing encryption and may only be decoded and decrypted using a code entered by the designated receiver.

Certified Facsimile Transmission

Utilizing the digital encryption facsimile machine of the present invention, the present invention provides for transmitting facsimile representation that may be "certified". In the present invention, in the process of receiving a fax, a certification indication is provided to the sender that enables the certification process. In the one embodiment, the certification indication in the present invention is a certification signal (or a certification request signal) sent back to the sender's facsimile machine using the communications network.

In the present invention, the certified facsimile system may be configured to provide the certification indication (e.g., signal) at one of many different times. For instance, the system may be configured to provide the certification indication prior to decryption. In another embodiment, when the fax received is encrypted, the certification indication is transmitted over the communications network to the sender when the receiver decrypts the fax with the facsimile machine of the present invention. Thus, the sender knows that the receiver has in fact decrypted the information. This decryption can occur minutes, hours, days or weeks after the transmission itself (or on a different facsimile machine). Thus, the certification indication is sent when the fax is being decoded. The certification indication may be sent to the originating fax modem, to a clearinghouse or to another suitable location that may receive facsimile transmissions and may be designated by an individual. Moreover, encryption may be used on the certification signal for privacy and/or authentication.

FIG. 4 illustrates a block diagram of the facsimile transmission system for providing certified faxes according to the present invention. Referring to FIG. 4, a source document 401 is inputted into the facsimile machine 402 which provides for fax transmission 403 to facsimile machine 404 which prints an encrypted document 405. The encrypted document 405 is delivered to the designated receiver at some unspecified time later. The designated receiver feeds the encrypted document 405 into facsimile machine 406 which scans, decodes and decrypts the document 405 to provide a reconstructed version of source document 401. Upon decrypting the encrypted document 405, a certification signal 407 is sent back to facsimile machine 402 to indicate that the fax has been decrypted. Alternatively, prior to decrypting document 405, a certification signal 407 is sent and encrypted document 405 is decrypted only after a certification acknowlege signal 408 is received by facsimile machine 406.

FIG. 5 illustrates the process of transmitting a certified fax according to the system depicted in FIG. 4. Referring to FIG. 5, the sender initially places the source document into the facsimile machine, enters a secret key for encryption, and initiates the sending of the fax, such as by pressing a transmit button (processing block 501). The telephone number designated to receive a certification indication is encoded with the document information when the source document 401 is scanned in and encrypted by facsimile machine 402 (processing block 502).

Facsimile machine 402 encrypts the sender's telephone number with the information on the source document 401 and transmits the fax (as fax transmission 403) to facsimile machine 404 (processing block 503). Facsimile machine 404 prints the encrypted fax and the fax is forwarded to the receiver (processing block 504). Note that the encryption may be performed by facsimile machine 404, instead of facsimile machine 402. However, in such a case, to insure secure transmission of fax transmission 403, STUs may be required to provide a secure telephone line between facsimile machines 402 and 404.

At an unspecified time later (represented as the dotted arrow), the receiver decrypts the encrypted document 405 using facsimile machine 406 to produce a reconstructed version of source document 401 (processing block 505). Note that facsimile machine 406 may be the same facsimile machine as facsimile machine 404, such that the facsimile machine receiving the fax may be used to decrypt the fax as well. During the decryption process, a certification signal 407 is returned to facsimile machine 402. In the present invention, the certification signal 407 may be sent to indicate that the document has been decrypted. In another embodiment, the certification signal 407 may be sent as a request to decrypt the document. In such an embodiment, if the destination of the certification signal permits, then decryption follows. Note that facsimile machine 406 is able to ascertain the destination of the certification signal using a designated telephone number encoded in the document.

When decrypting the message, if the facsimile machine responsible for decrypting the encrypted fax attempts to send the certification request signal to the facsimile machine designated by the encoded telephone number and a busy signal is received or the telephone number is otherwise non-responsive, the facsimile machine may delay the sending of the certification signal and resend the certification signal at a later time. If at that time, the sender's facsimile machine is no longer busy, the facsimile machine designated by the sender may receive the certification request signal, thereby indicating that the fax has been received by the designated receiver.

FIG. 6 indicates the one embodiment of the decryption process of a certified fax according to the present invention. Referring to FIG. 6, after the encrypted fax has been received, the receiver places the encrypted fax into the facsimile machine and enters their code for decrypting the received fax (processing block 601). The code may be a private key of the receiver. The facsimile machine scans the encrypted information from the fax into storage. The scanning of the encrypted information may occur immediately after the document is placed into the document feeder of the facsimile machine.

The facsimile machine makes contact with a certifying machine (i.e., the facsimile machine designated in the encrypted information) at processing block 602. In the present invention, the facsimile machine sends a certification signal to the number encoded on the received fax. In one embodiment, the encrypted fax is decrypted and printed after sending the certification signal.

In one embodiment, the facsimile machine sends a certification signal with a request for a decryption key. The request may include the public key of the receiver and may be encrypted using the receiver's private key and the public key of the certifying machine. A facsimile identifier may be used to identify the source location of the request and/or to identify the document for which decryption is being requested.

The certifying machine uses the receiver's public key to decrypt the request. The certifying machine is capable of determining whether to allow the decryption, and sends the decryption key, if able to respond. The decryption key may be encoded with the public key of the requesting facsimile machine.

The decryption key is received by the requesting facsimile machine (processing block 603), which decrypts the encrypted fax and prints the decrypted information to produce the reconstructed version of the original (processing block 604).

The facsimile machine used to perform the decryption may only be allowed to decrypt the fax if the facsimile machine designated by the encoded number is reached for transmission of the certification signal. If a sender's facsimile machine is busy, the facsimile machine does not decrypt the received fax.

In one embodiment, the decoding facsimile machine sends the encrypted data to the location designated by the document, where the data is decoded and sent back to the decoding facsimile machine for printing. The decoded data may be sent back and printed while other data is being decoded.

The certification request signal may be sent out immediately to a facsimile machine other than the facsimile machine used to send the encrypted fax. In one embodiment, this other facsimile machine may be located at a number of different places, such as a central clearinghouse or a facility used to monitor documents to ensure that documents have been received by designated parties.

In one embodiment, the sender can deny the request and cancel authorization for the receiver even after the fax has been sent but prior to the receiver decrypting the fax. For instance, if the receiver has not yet decrypted the encrypted fax message after a designated period of time (e.g., day, week, etc.), the sender can program their fax to deny decryption to the receiver. This ensures that no out of date information is decrypted by the receiver. In one embodiment, this may be accomplished by not allowing the facsimile number to recognize the certification signal.

Furthermore, the present invention provides capabilities for allowing the sender to cancel authorization for decryption of a portion of the fax document. That is, the sender may program the facsimile machine receiving the certification signal to only provide authorization to decrypt a portion of the fax. In one embodiment, this may be accomplished by encrypting portions of the document using different encryption techniques and then only providing certain decryption keys, such that some of the information could not be decrypted because the required key is not provided by the certifying machine. This may be useful where a portion of the information in the original fax is no longer current or where the sender no longer desires the receiver to have access to that information. In one embodiment, where encrypted data is being sent from the decoding facsimile machine to a location for decoding, only that portion of data the original sender (e.g., original fax sender) desires decoded is returned to the decoding facsimile machine. Moreover, the certifying machine may send updated information when receiving the certification request.

Note that the fax decrypted/certification signal is different from the standard fax "acknowledge" signal that accompanies all current fax transmission. The signal is sent to the facsimile machine designated on the document whenever the receiver decrypts the message. In one embodiment, the receiver can only decrypt the encrypted fax document when the decrypted facsimile machine is available through the telephone lines. It is at this point that is the sender is sure that the receiver has received the decrypted fax message.

Thus, the present invention provides for certifiable transmission of information via facsimile between two parties. There is no need for the receiver to be present to "sign" for the incoming document when it arrives. The document can lie in a "fax received" pile until the receiver himself decrypts it. It is at this time that the receiver, effectively, signs for the document. Thus, a certified fax can be sent at any time even if the receiver is not present to actually receive it.

A benefit of this certified fax system is that there is no need for much memory to be added to the facsimile machine. All the information, and particularly the "reply" telephone number of the facsimile machine designated by the sender, is stored in the encrypted document itself. Using such an implementation, the fax circuitry required is simple and inexpensive. Furthermore, the certified fax of the present invention is faster and cheaper than the overnight delivery systems and the U.S. Mail.

One Embodiment of the Document Transmission Device of the Present Invention

FIG. 7 illustrates an overview of one embodiment of the document transmission device of the present invention shown in block diagram form. The system of the present invention is a digital processing system. In the currently preferred embodiment, the digital processing system comprises a digital facsimile machine. In one embodiment, the operation of a digital facsimile machine is simulated using a scanner, printer and computer.

Referring to FIG. 7, the system of the present invention includes a bus or other communication means 701 for communicating information. Controller 702 is coupled with bus 701 for processing information. A random access memory (RAM) or other dynamic storage device 703 (commonly referred to as a main memory) for storing information and instructions for controller 702 is also coupled to bus 701. Also coupled to bus 702 is a read only memory (ROM) or other static storage device 704 for storing static information and instructions for controller 702 and a data storage device 705, such as a magnetic disk and disk drive for storing information and instructions.

The processing system also includes a scanner 706 coupled to bus 701 for scanning selected hard copy documents into the facsimile machine. Scanner 706 is capable of reading digital representations of images (i.e., digital paper), as well as regular images. In order to differentiate between whether scanner 706 is reading a regular image or a piece of digital paper, some form of automation could be employed to search a portion of the document to determine that the hard copy document being scanned is a piece of digital paper. In another embodiment, a key is entered which indicates to scanner 706 that the hard copy being scanned is a piece of digital paper.

In one embodiment, scanner 706 comprises a gray scale scanner. In the currently preferred embodiment, this resolution is 200 DPI. Scanner 706 converts the individual picture elements, referred to as pixels, of the scanned image into digital values. In other embodiments, scanner 706 is a bitmap scanner which scans the image of each hard copy input document in a predetermined spatial resolution to produce digital values. These digital values collectively produce a data structure known as a bitmap image, which is well-known to those in the art.

In one embodiment, the controller 702 also performs encryption and decryption. Note that controller 702 performs the error correction encoding, encoding, decoding, and error detection and correction processes of FIGS. 8 and 9 in conjunction with the input from scanner 706. Thus, in one embodiment, controller 702 operates as the encoder and the decoder of the present invention.

A hard copy device 707 is also coupled to bus 701 for printing hard copies for providing visual representations of received documents and documents input into the scanner (such as when encrypted documents are being input for decryption by the facsimile machine). In one embodiment, hard copy device 707 comprises the printer portion of a facsimile machine. In other embodiments, hard copy device 707 could comprise a plotter or printer, such as a bitmap printer that maps the digital values of a bitmap image into pixels which are printed on the plain paper.

Moreover, a human or user interface 708 is included for enabling a user to interact with controller 702, scanner 706 and hard copy device 707. User interface 708 represents the input and output devices through which the user enters control instructions, including telephone numbers, to and receives feedback from the facsimile machine (i.e., controller 702, scanner 706 and hard copy device 707). The feedback indicates the actions that are taken by the facsimile machine in response to instructions that are entered by the user.

User interface 708 is also used to enter a key for encryption and decryption processes, as will be described in conjunction with FIGS. 8 and 9 below. In response to the key, the controller 702 accesses memory to determine the type of encryption to perform. The memory stores codes that are used for encryption. When sending a secured fax, a key is also entered into the decrypting facsimile machine, causing a similar access to occur to enable the decryption. Note that the use of keys with encryption/decryption is well-known in the art.

User interface 708 could include an alphanumeric input device including alphanumeric and other keys for communicating information and command selections, a cursor control device for controlling cursor movement and/or a display device, such as a cathode ray tube, liquid crystal display, etc. for displaying information to the facsimile user.

Network interface 710 provides access to the communication channel (e.g., port). Network interface 710, in cooperation with controller 702, allows for transmitting faxes on a communications network.

Note that, although in the currently preferred embodiment, all of these components are integrated into a single facsimile system, each of the components, such as scanner 706 and hard copy device 707, may be separate components. In one embodiment, scanner 706 and/or hard copy device 707 could be coupled to bus 702 using dedicated communication links or switchable communication networks.

The facsimile machine utilized to allow certification of facsimile transmissions includes the necessary hardware and/or software to implement the typical facsimile machine, including encryption/decryption. Although the facsimile machines of the present invention includes the functionality to dial up another facsimile machine, a minor change to the facsimile machine allows the facsimile transmission to recognize the designated response phone number from the scanned in data from the fax itself and dial that number during decryption. This could be facilitated by redefining an area on the encrypted fax at which the designated response phone number is always to be located, such that the facsimile machine upon scanning the encrypted fax would be able to ascertain the phone number at that predefined location.

Furthermore, the facsimile machine of the present invention includes functionality to provide a certification indication to the designated facsimile machine. This indication may be a signal sent via network interface 710, on the existing communications network and could comprise a few bytes of information that accompany the information that was already transmitted between the two facsimile machines to establish a connection. For instance, these extra bytes could be sent in the set-up protocol where the facsimile machines decide on the baud rate at which they will operate.

Additional hardware utilized by the present invention includes a memory that may be accessed in response to the certification signal to provide the acknowledgment necessary to allow the facsimile machine sending the certification signal to decrypt the encrypted fax.

Encryption and Formatting of Digital Data

FIG. 8 illustrates the encoding process of the present invention. The encoding process produces a sheet of paper which stores digital information. Thus, the result of the encoding process of the present invention is referred to herein as "digital" paper.

Referring to FIG. 8, in the present invention, data source 801 comprises digital data. In one embodiment, data source 801 is derived from a source of data that is scanned by a scanning device. In the present invention, the scanning device is the scanner portion of a facsimile machine. Note that in the currently preferred embodiment, the scan of the paper comprises digital data. Note also that the compression performed on the data has been signified in FIG. 8 by compression processing 802. In other embodiments, data source 801 could come from an ASCII data file, a JPEG compressed color image or even a binary executable file, especially when the data is being faxed using a personal computer and it's source is a file that is currently being stored. In other words, the data source 801 of the present invention can come from any source, including text, fax data, gray scale or even color image data. It should be noted that in the present invention, compression may or may not be performed. If compression is performed, various forms may be utilized, including both lossy and lossless compression techniques depending on whether the compressed data must be recreated in the exact form as the original.

Once the data source 801 is in digital form and any desired compression has taken place (processing block 802), then the data undergoes encryption (processing block 803). In one embodiment, the encryption is accomplished using software. In one embodiment, the software encryption is provided by exclusive-ORing the initial data with a pseudo-random sequence generated using a secret key as a seed. Note that in this case, the decryption process (as described below later) is simply exclusive-ORing the data with the same pseudo-random sequence. Note that this type of encryption process is not perfectly secure method of data encryption because of the short key length used to seed pseudo-random sequences and the fact that the same key is likely to be used on more than one message. There are well-known methods to attack this type of encryption.

In order to obtain secure data through encryption, a one time pad can be employed in place of the pseudo-random sequence. A one time pad comprises a series of randomly generated bits that are known to both parties (i.e., the "encrypting" party and the "decrypting" party) and is only used once in the encryption process. In a one time pad, the key length is equal to the message length and may be more than 100,000 bits. Since the one time pad is used once, it is not susceptible to the same attacks which are used on pseudo-random sequences.

In another embodiment, encryption processing could be performed using the digital encryption standard (DES) or the RSA algorithm. In the RSA algorithm, digital data is encrypted using two prime numbers which are multiplied together, as is well-known in the art. In the case where each of the two prime numbers has approximately 200 digits, the RSA algorithm offers a very secure encryption method. Note that to use DES in one of the feedback modes or to use the RSA algorithm, it is necessary that errors do not occur in the encoding and decoding of the digital data stream. If an error occurs, any information beyond the location of the error would be lost. Alternatively, the encryption process can periodically be restarted so that only a portion of the message is lost if too many errors occur. It should be noted that any digital encryption method may be employed with the present invention.

After any desired compression and encryption, error correction encoding may be performed (processing block 804). Since the plain paper is used as a digital channel, the error correction of the present invention can be viewed as just another box with digital input and digital output. Error correction encoding (processing block 803) comprises adding correction or "parity" bits to the digital information of the encrypted data source 801. In one embodiment, the error correction is performed using software. The software used to perform error correction is a shortened-interleaved Reed-Solomon code over GF (256) to provide the forward error correction. In the Reed-Solomon code over GF (256), one byte of data is taken from each box and combined using additions and multiplications in a finite field to produce two checksum bytes. In one embodiment, these bytes are encoded in the final two boxes on the page. For more information on Reed-Solomon Coding including the terms "shortened" and "interleaved", see Richard E. Blahut, *Theory and Practice of Error Control Codes*, Addison-Wesley, 1983.

As will be described below, in one embodiment, the data is printed by the receiving facsimile machine in a format by which the data is stored on the plain paper in several boxes spread out on the page. The error correction code is interleaved by an amount equal to the number of bytes stored in one box on the page. It is therefore possible to lose an entire box without any uncorrectable errors. In this embodiment, one byte from each of the first ten boxes is used to compute the parity bits which are stored in the final two boxes. Note that in the present invention the boxes with the parity bits are no different than the other boxes of digital data on the plain paper. One parity box can be lost and the entire message can still be constructed just as for the data boxes. In one embodiment, twelve boxes of data are used for data storage on the paper.

Note that there is an advantage to using information about the formatter to select the parameters the error correction. That is, since error correction can group any set of bytes together, if the location of the bytes on the page is known, then bytes used in the error corrections may be those which are separated on the page. In this manner, error correction results which can better handle situations where a large portion of the plain paper has sustained damage (for instance, such as the damage due to a coffee spill). In addition, parameters can be chosen based on the decoder. Thus, if a very high resolution scanner is used in decoding, then the coder could attempt to transmit more data. If the scanner has a large platen, then more information can be decoded (all other things being equal). If it is known that the particular receiver is highly noisy, then a more robust error correction method could be used.

Once the data source 801 is in digital form, any desired compression has occurred (processing block 802), encryption (processing block 803) and any desired error correction encoding has been performed (processing block 804), the digital data is formatted into distinct colored pixels (processing block 804) which can be printed. In one embodiment, the digital data is formatted into black and white pixels. In one embodiment, the pixels are printed by the printer portion of the photocopier.

The formatting step of the present invention (processing block 805) is responsible for changing a digital bit sequence into a form which can be accurately scanned and a format which is readable by a facsimile machine.

After formatting (processing block 805), the data is printed (processing block 806). In the present invention, the printing of the data is performed by using the printer portion of the facsimile machine.

In order to write the bits on the paper, initially a stream of data to be stored on the piece of paper is stored as a block of black and white dots, or data pixels, on the paper. In one embodiment, a "1" bit can be stored as a white dot and "0" bit as a black dot. The data pixels utilized must be larger than the scanning resolution so that the scanning sample will lie within the printed pixel. In addition, a frame (or border) is placed around the block of data so that the position to read each pixel from can be accurately determined. An example of one such digital data box is shown in FIG. 10A. If the data block is too large, problems with paper stretch and scanner misalignment may make reconstruction of the original data difficult.

Referring to FIG. 10A, in the currently preferred embodiment, to ensure the data spacing and alignment could be determined, the black and white bits are placed in several boxes on the page. In one embodiment, twelve boxes of data are used for each 8½×11 inch sheet of paper, such as is shown in FIG. 10B (excluding the header information). In one embodiment, each box has a border that is three data pixels thick and mostly black. By having a border around each box, it is easier to locate the edge of the box (when decoding). Note also that in each corner of each box, there is a large white pixel. An examination of the box also reveals alternating pixels along both the left and right edges. These are used to accurately determine the current location of a horizontal line of pixels when reading the data. Note that the alternating pattern of black and white pixels is added to the left and right edges of each box to compensate for the possible variance in the vertical spacing of the pixels. These alternating pixels are not required where the vertical spacing between the pixel rows does not vary by an amount which would cause the incorrect reading of the data (upon decoding).

Note that although twelve small boxes each storing several bytes of data is used in one embodiment, any number of boxes could be used, including only a single box. This is a design choice. A small box uses more overhead for the frame, and the space between the boxes is unused for data, but requires less correction data to be added to the encoded data (i.e., a lower error rate).

Note also that the present invention may use grayscale inks and store additional information in the gray level. In this manner, for example, eight shades of gray could be used to obtain three bits of data from a grayscale printer and scanner.

Overview of the Decoding process of the Present Invention

FIG. 9 illustrates the decoding process of the present invention. The decoding process of the present invention inverts the operation of the encoding process one step at a time. Initially, the sheet of digital paper is scanned (processing block 901). The scanned data is then sampled to produce a binary sequence representing the one received by the encoding process (processing block 902). Note that the result of the scan is a binary sequence which is close to the one given to the encoder. The result of the scanning may not produce an exact duplicate of the data sent to the encoder. This may be due to errors in the scanning of the data. For instance, an exact duplicate may not be sent to the decoder due to errors in the registration, flatness, skew, or scanner defects during the scanning process.

After the "digital" paper has been decoded (processing block 902), error detection and correction is performed (processing block 903). The error correction compensates for the loss of data due to damage to the paper or due to the failure to predict the pixel location correctly. The error detection and correction processing (processing block 903) is the inverse of the error correction encoding which occurred during the encoding process (FIG. 8). The error detection and correction occurs by using the parity bits added during the encoding process of FIG. 8 to correct errors which may have occurred (processing block 903). The errors may be attributed to staples, hole punches, paper discolorations, technical problems or other paper imperfections and damages.

After any required error corrections, the data is decrypted (processing block 904). The decryption processing (processing block 904) is the inverse of the encryption performed during the encoding process (FIG. 8). In one embodiment, the decryption process requires the use of the same key used during encryption. By using the same key, the original data is recreated.

Once any required error correction and the decryption are performed, the data may undergo decompression (processing block 905). The decompression performed depends on whether compression was performed during the encoding process and is performed to restore the data, as near as possible, to its original form.

After decoding (processing block 902), error detection and correction (processing block 903), decryption (processing block 904) and any desired decompression (processing block 905), the reconstructed data is available and can be printed, displayed or stored on a disk. In one embodiment, the data is printed (processing block 906). In one embodiment, if the original data was a simple scan, a copy of the original can be printed. In another embodiment, if the original data was several pages of ASCII or Postscript data, the data can be printed or stored in a file. In another embodiment, if the original was a JPEG compressed color image, the image may be displayed.

When the methods of encryption (and decryption) of the present invention are being integrated into the encoding and decoding processes, the present invention also provides data information to be transferred using plain paper in a manner which preserves its privacy and/or authentication. In the present invention, this privacy can easily be obtained through the use of a key or code known to the user(s) when encryption and decryption of a document occurs. Note that the present invention provides for encryption of information using the facsimile. Using the present invention, a user could place a confidential document on a facsimile machine, press an encrypt button and enter a secret key. The facsimile machine would then scan the sheet and produce an encrypted copy. This encrypted copy could be transported to the intended receiver, who inputs it into a facsimile machine, presses a decryption button and enters the same secret key. The facsimile machine then produces a readable copy of the original document. The present invention also allows the encrypted copy to be treated as a normal document and be copied or stapled without greatly affecting the final decrypted document.

The present invention provides for secure encryption of a document because any person who does not know the secret key will be unable to determine the contents of the encrypted document.

Another useful application of the present invention is the authentication of a document. Specifically, the present invention could be used to authenticate signed facsimile transmissions. Through the use of digital signatures, authentication could be simple. If a facsimile allowed digital signing of a document, then digital signatures could be used for all business transactions. The authentication might consist of a small block of digital, encrypted data on an otherwise human readable document. Using the secret key, a person would be able to obtain the digital data in the small block, therein being able to verify its source. In addition, the codes could prevent forgery or provide secret information since only those using the correct key or code would be able produce the digital paper.

Scanning Digital Paper

In order to decode the digital paper, the entire sheet is scanned with a scanner at high resolution. In one embodiment, the entire sheet is scanned with a gray scale scanner. A software routine is used to generate a binary sequence from the scanned in data. The result produced by the software routine is a binary sequence. A flow chart of the decoding routine is shown in FIG. 11. Note that FIG. 12 illustrates a portion of the decoding process.

Referring to FIG. 11, once the digital paper is scanned in an over sampled manner, the decoding routine begins by locating the boxes on the page by searching for the black border (processing block 1101). In one embodiment, the search for the black border is accomplished by scanning a row until a predetermined number of black pixels are found in a row. In the currently preferred embodiment, the borders are 3 pixels thick. The number and approximate position of the boxes on the page is assumed to be known by the decoding process (since how the digital paper is produced is known by the decoding process). However, this is not a requirement since the frame should be easy to identify even on a page full of text. Note also that in one embodiment, the size of the boxes is known to the decoding process. Therefore, once a border has been located, the other borders are located by searching the vertical and horizontal directions until the other borders of the box are located (processing block 1102).

After the borders of the data blocks have been located, the four white dots are located at each corner of each box (processing block 1103). In one embodiment, these white dots are located by searching the corners for the brightest pixel. Since the scanning resolution used in one embodiment is at least twice the printing resolution, each corner should have several white scanned pixels.

Because an encrypted page may be copied several times, the spacing between information pixels may change and the rows of pixels will not be perfectly aligned with the scanning row. The brightest pixel is used as the correct position to find the remainder of the data. In other words, the four white corner dots are used by the present invention to determine the horizontal spacing between the information pixels within the boxes. Once the width and height of the box (in number of data pixels) are known and the corners have been located, the horizontal and vertical spacing is determined (processing block 1104).

To find the horizontal and vertical spacing when the corners have been found, the alternating pattern of black and white pixels added to the right and left edges of the box during the encoding process to compensate for the variance of the vertical spacing are examined to determine the vertical spacing between the information pixels. First, the top two corners are joined by an imaginary line (processing block 1104A). The joining of the two top corners is explicitly shown in FIG. 12. A synchronization column is then approximated as a fraction of a distance between the corners (processing block 1104B). The synchronization column has been shown as an imaginary line in FIG. 12. Next, the decoder finds all of the transitions in the synchronization column (processing block 1104C). In one embodiment, the decoder records the location of every black-to-white or white-to-black transition. Then, starting from the point between two transitions on the left, an imaginary line can be drawn to the point between two transitions on the right (processing block 1104D). Note that these lines are drawn in FIG. 12. Even though one of the rows of data is much shorter than the others and one is much taller, the correct place to read the rows can still be determined. Finally, since the number of data pixels is known, this horizontal line can be divided into the correct number of pieces and sampled at the correct location (processing block 1104E).

With the vertical and horizontal spacing determined, it is possible to compute the two dimensional grids from which the data pixels can be sampled. Finally, the data box is examined horizontally and if the sample at the predicted location is closer to black than white, a 0-bit is emitted; otherwise, a 1-bit is emitted (processing block 1105). In one embodiment, a bi-linear interpolation of the four pixels closest to the desired location is used to determine the value of the data. Given an interpolation of the value of the pixel at the real location, the average is compared with expected values for white or black pixels. Then if the sampled pixel is closer to white, the pixel is assumed to be a "1" data bit; otherwise, the data is assumed to be a "0" data bit. Note that other methods of interpolating and sampling may be used and are known to those skilled in the art. For example, a faster method would use the pixel closest to the desired sample point without any interpolation.

Note that encoding digital paper is similar to disk storage because binary data is mapped into space. Therefore, well-known disk storage systems, such as RLL, MFM, $M^2FM$ and others, can be used to improve encoding. Most of these methods utilize data transitions rather than data states. Data would then be encoded by the location of a change from one color to another, rather than the color itself. Another possible improvement is using the ink transitions to accurately determine the pixel spacing and data locations. Thus, the transitions provide not only data, but also the pixel spacing. Decoding is done with a phase lock loop algorithm.

Whereas many alterations and modifications of the present invention will no doubt become apparent to a person of ordinary skill in the art after having read the foregoing description, it is to be understood that the particular embodiment shown and described by way of illustration are in no way to be considered limiting. Therefore, reference to the details of the preferred are not intended to limit the scope of the claims which themselves recite only those features regarded as essential to the invention.

Thus, a method and apparatus for sending secure facsimile transmissions and certified facsimile transmissions has been described.

We claim:

1. A method for sending an original document from a first site to a second site, said method comprising the steps of:

encrypting a first series of digital data values representing the original document to create an encrypted set of data;

formatting the encrypted set of data into at least one data box containing a plurality of contiguous rows and a plurality of contiguous columns of pixels an said at least one data box having a frame with alternating pixels along at least two opposite sides and with pixels in corners in the frame to determine vertical and horizontal spacing between rows and columns of pixels within said at least one data box;

sending the encrypted set of data over a communications network to the second site;

printing the encrypted set of data at the second site on a piece of paper to produce an encrypted representation of the original document; and decrypting the encrypted representation to produce a second series of digital data values; and fixing the second series of digital data values in a tangible medium to create a reconstructed version of the original document.

2. The method defined in claim 1 wherein the step of encrypting comprises the steps of entering a key, and performing encryption on the first of digital data values according to the key entered.

3. The method defined in claim 1 wherein the step of decrypting comprises the steps of scanning the paper to produce an encrypted series of data values, entering a second key and decrypting the encrypted series of data values according to the second key.

4. The method defined in claim 1 where the step of fixing the second series of digital data values comprises the step of printing the second series of digital data values on a piece of paper.

5. The method defined in claim 1 further comprising the step of decrypting the encrypted set of data to produce a decrypted version of the first series of digital data values at the second site after the encrypted set of data has been received and encrypting the decrypted version of the first series of digital data values to produce the encrypted set of data values to be printed.

6. The method defined in claim 1 further comprising the step of scanning the original document.

7. A method for sending an original document from a first site to a second site, said method comprising the steps of:

acquiring the original document as a first series of digital data values at a first site;

encrypting the first series of digital data values to create an encrypted set of data;

formatting the encrypted set of data into at least one data box having a plurality of contiguous rows and a plurality of contiguous columns of pixels, wherein the step of formatting includes framing said at least one data box with alternating pixels along at least two opposite sides for identifying vertical separations between the plurality of rows of data and having pixels in corners in the frame to determine horizontal spacing between pixels within said at least one data box;

sending the encrypted set of data over a communications network to the second site;

printing the encrypted set of data at the second site on a piece of paper to produce an encrypted representation of the original document; and decrypting the encrypted representation to produced a second series of digital data values; and fixing the second series of digital data values in a tangible medium to create a reconstructed version of the original document at the second site.

8. The method defined in claim 7 wherein the step of encrypting comprises the step of entering a key, wherein the first series of digital data values are encrypted according to the key entered.

9. The method defined in claim 7 wherein the step of decrypting comprises the step of scanning the plain paper to produce an encrypted series of data values, entering a second key and values according to the second key.

10. The method defined in claim 7 where the step of fixing the second series of digital data values comprises the step of printing the second series of digital data values on a piece of paper.

11. The method defined in claim 7 further comprising the step of decrypting the encrypted set of data to produce a decrypted version of the first series of digital data values at the second site after the encrypted set of data has been received and encrypting the decrypted version of the first series of digital data values to produce the encrypted set of data values to be printed.

12. The method defined in claim 7 wherein the step of acquiring comprises scanning the original document.

13. A method for sending an original document from a first site to a second site, said method comprising the steps of:

scanning the original document into a first series of digital data values at a first site;

sending the series of digital data values over a communications network to the second site;

encrypting the first series of digital data values to create an encrypted set of data;

formatting the encrypted set of data into at least one data box having a plurality of contiguous rows and a plurality of contiguous columns of pixels, wherein the step of formatting comprises framing said at least one data box with alternating pixels along at least two opposite sides for identifying vertical separations between the plurality of rows of data and having pixels in corners in the frame to determine horizontal spacing between pixels within said at least one data box;

printing the encrypted set of data at the second site on a piece of paper to produce an encrypted representation of the original document; and decrypting the encrypted representation of the original document to produce a second series of digital data values; and fixing the second series of digital data values in a tangible medium to create a reconstructed version of the original document.

14. A method for sending an original document from a first site to a second site, said method comprising the steps of:

scanning the original document into a series of digital data values at a first site, wherein the step of scanning comprises formatting said series of digital data values into at least one data box having a plurality of contiguous rows and a plurality of contiguous columns of pixels of encrypted data, and framed with alternating pixels along at least two opposite sides for identifying vertical separations between the plurality of rows of data and having pixels in corners in the frame to determine horizontal spacing between pixels within said at least one data box;

sending the series of digital data values over a communications network to the second site;

printing the encrypted set of data at the second site onto a piece of paper to produce an encrypted representation of the original document; and decrypting the encrypted representation of the original document to produce a first series of digital data values; and fixing the second series of digital data values in a tangible medium to create a reconstructed version of the original document.

15. A facsimile transmission system for securely transmitting a facsimile of an original document, said system comprising:

a communications channel;

a first facsimile machine coupled to the communications channel, wherein the first facsimile machine comprises a scanner to scan the original document to produce a first plurality of data values, an encryption mechanism coupled to receive the first plurality of data values to encrypt the first plurality of data values into a second plurality of data values, a formatter coupled to receive and format the second plurality of data values into at least one data box containing a plurality of contiguous rows and a plurality of contiguous columns of pixels an said at least one data box having a frame with alternating pixels along at least two opposite sides and with pixels in corners in the frame to determine vertical and horizontal spacing between rows and columns of pixels within said at least one data box, a transmitter for transmitting the second plurality of data values on the communications channel once formatted;

a second facsimile machine coupled to the communications channel, wherein the said facsimile machine receives the second plurality of data values and prints the second plurality of data values onto a first piece of paper; and a third facsimile machine configured to receive and scan the first piece of paper to reproduce the second plurality of data values, wherein the third facsimile machine includes a decryption mechanism to decrpyt the second plurality of data values into the first plurality of data values, said third facsimile machine printing the first plurality of data values onto a second piece of paper.

16. The system defined in claim 15 wherein the second facsimile machine and third facsimile machine are the same, such that the first piece of paper is re-inserted into the facsimile machine that generated the first piece of paper.

17. The system defined in claim 15 wherein the first facsimile machine includes a keypad for entering a first key, wherein the encryption mechanism of the first facsimile machine encrypts the first plurality of the data values according to the first key being entered on the keypad.

18. The system defined in claim 15 wherein the third facsimile machine includes a keypad, wherein the decryption mechanism of the third facsimile machine decrypts the second plurality of data values generated from scanning the first piece of paper to produce the first plurality of data values.

19. The facsimile machine defined in claim 18 wherein the first facsimile machine further comprises a keypad, wherein the encryption mechanism operates to encrypt data in the storage location in response to a key being entered on the keypad.

20. A facsimile transmission machine comprising:

a scanner;

a storage device coupled to the scanner, wherein the scanner scans in documents that are stored in the storage location;

a channel port coupled to a communications channel for receiving and sending of data from and to the communications channel respectively, wherein the channel port stores data received from the communications channel in the storage location or sends data that is stored in the storage location over the communications channel;

a printer coupled to the storage device for printing data stored in the storage device;

a controller coupled to the scanner, channel port, storage location and the printer to provide control to the scanner, storage location and printer;

an encryption mechanism coupled to the controller and to the storage location for providing encryption to documents being input for transmission by the facsimile machine, wherein the controller controls the scanner to produce a series of digital data values that are encrypted by the encryption mechanism; and a formatter coupled to the encryption mechanism to format each series of digital data values into at least one data box containing a plurality of contiguous rows and a plurality of contiguous columns of pixels an said at least one data box having a frame with alternating pixels along at least two opposite sides and with pixels in corners in the frame to determine vertical and horizontal spacing between rows and columns of pixels within said at least one data box, which are then sent over the channel when performing a facsimile transmission.

21. The facsimile machine defined in claim 17 further comprising a decryption mechanism coupled to the storage location and the controller, wherein decryption mechanism performs decryption on data in the storage location received from the communications channel.

22. The facsimile machine defined in claim 21 wherein the facsimile machine further comprises a keypad, wherein the decryption mechanism operates to decrypt data in the storage location in response to a key being entered on the keypad.

23. A method for producing a reconstructed version of an original document from a previously transmitted encrypted copy of the original document comprising the steps of:

scanning the previously transmitted encrypted copy into a series of digital data values using a scanner of a facsimile machine;

entering a first key;

the facsimile machine sending an indication to a location designated by the encrypted copy in response to the first key; and decrypting the encrypted copy to produce the reconstructed version of the original document.

24. The method defined in claim 23 further comprising the step of obtaining a decryption key from the location which is sent in response to the indication, and wherein the encrypted copy is decrypted using the decryption key.

25. A method for producing a reconstructed version of an original document from a previously transmitted encrypted copy of the original document comprising the steps of:

scanning the previously transmitted encrypted copy into a series of digital data values using a scanner of a facsimile machine;

entering a first key into the facsimile machine;

the facsimile machine generating a request to a location designated by the encrypted copy in response to entering the first key;

receiving a decryption key from the location in response to the request;

decrypting the series of digital data values using the decryption key to generate the reconstructed version of the original document.

26. The method defined in claim 25 further comprising encrypting the request.

27. The method defined in claim 26 wherein the request is encrypted using a private key of the facsimile machine and a public key of the location.

28. The method defined in claim 25 wherein the request includes an identifier specifying the facsimile machine as originating the request.

29. The method defined in claim 25 wherein the step of receiving comprises the steps of:

receiving a response from the location; and decoding the response to obtain the decryption key.

30. A method for transmitting a document from a first site to a second site, said method comprising the steps of:

receiving the facsimile transmission at the second site of an encrypted series of data values representing the document from the first site;

decrypting the encrypted series of digital data values into a reconstructed version of the document by entering the facsimile transmission into a facsimile machine, wherein the step of decrypting comprises sending an indication to a location designated in the series of digital data values.

31. The method defined in claim 30 wherein the step of sending the indication occurs after receiving of the series of digital data values at the second site and prior to generating the reconstructed version.

32. The method defined in claim 31 further comprising the step of receiving an acknowledgment from the first site after sending the indication, wherein the reconstructed version is not generated until after the acknowledgment from the first site is received.

33. The method defined in claim 30 wherein the step of sending the indication occurs after generating the reconstructed version of the document.

34. The method defined in claim 30 wherein the step of sending the indication comprises sending the indication to a location designated in the series of digital data values.

35. The method defined in claim 34 wherein the location comprises the first site. comprises a clearinghouse.

36. The method defined in claim 34 wherein the location comprises a site other than the first site.

37. The method defined in claim 30 wherein the step of encrypting the document comprises encrypting only a portion of the document and the step of decrypting comprises decrypting the portion of the document.

38. The method defined in claim 30 further comprising the step of encrypting the indication.

39. A method for transmitting a document from a first site to a second site, said method comprising the steps of:

digitizing the document at the first site into a first series of digital data values;

encrypting at least a portion of the first series of digital data values to produce a second series of digital data values;

transferring the second series of digital data values to the second site; and decrypting at least a portion of the second series of digital data values to generate the reconstructed version of the document, and further wherein the step of decrypting comprises sending an indication to a location designated in the series of digital data values.

40. The method defined in claim 39 wherein the step of sending the indication occurs after receiving of the series of digital data values at the second site and prior to generating the reconstructed version.

41. The method defined in claim 40 further comprising the step of receiving an acknowledgment from the first site after sending the indication, wherein the reconstructed version is not generated until after the acknowledgment from the first site is received.

42. The method defined in claim 39 wherein the step of sending the indication occurs after generating the reconstructed version of the document.

43. A method for generating a reconstructed version of a document sent as a series of digital data values from a first site to a second site, said method comprising the steps of:

a facsimile machine sending a decoding request to a location designated in the series of digital data values in response to an encoded version of the document being scanned into the facsimile machine;

the facsimile machine receiving an acknowledgment signal;

decoding the series of digital data values to create the reconstructed version of the document in response to the acknowledge signal.

44. The method defined in claim 43 wherein the series of digital data values include encoded information, and the method further comprises the step of receiving a key to enable decoding of the series of digital data values.

45. The method defined in claim 43 wherein the location comprises the first site.

46. A method for generating a reconstructed version of a document sent as a series of digital data values from a first site to a second site, said method comprising the steps of:

a facsimile machine sending a request signal to a location designated in the series of digital data values in response to an encoded version of the document being scanned into the facsimile machine;

the facsimile machine receiving at least one decoding key from the location;

decoding a portion of the series of digital data values using said at least one decoding key to create the reconstructed version of the document.

47. The method defined in claim 46 wherein said at least one decoding key comprises a decryption key.

48. The method defined in claim 46 wherein the step of decoding comprises sending the series of digital data values to the location for decoding; receiving decoded data from the location; and generating the reconstructed version of the document from the decoded data.

* * * * *